United States Patent [19]
Sasaki

[11] Patent Number: 5,239,444
[45] Date of Patent: Aug. 24, 1993

[54] TILTABLE PORTABLE ELECTRONIC APPARATUS WITH SLIDING TILT LEG

[75] Inventor: Katumaru Sasaki, Tokyo, Japan

[73] Assignee: Kabushiki Kaisha Toshiba, Kanagawa, Japan

[21] Appl. No.: 874,098

[22] Filed: Apr. 27, 1992

Related U.S. Application Data

[62] Division of Ser. No. 598,519, Oct. 17, 1990.

[30] Foreign Application Priority Data

Oct. 20, 1989 [JP] Japan .................. 1-271722

[51] Int. Cl.$^5$ .................. H05K 5/02; G06F 1/16
[52] U.S. Cl. .................. 361/728; 361/679
[58] Field of Search .................. 341/22; 364/708; 248/677; 361/380, 392, 393, 394, 395, 399; 200/5 A; 235/145 R; 400/681

[56] References Cited

U.S. PATENT DOCUMENTS

| | | | |
|---|---|---|---|
| 2,540,297 | 2/1951 | Freeman et al. | 400/681 |
| 4,402,624 | 9/1983 | Stahl et al. | 400/681 |
| 4,568,056 | 2/1986 | Lewinski | 248/677 |
| 4,571,456 | 2/1986 | Paulsen et al. | 364/708 X |
| 4,658,124 | 4/1987 | Bertina | 235/145 R |
| 4,736,332 | 4/1988 | Crease | 364/708 |
| 4,742,478 | 5/1988 | Nigro, Jr. et al. | 364/708 |
| 4,951,241 | 8/1990 | Hosoi et al. | 364/708 |

FOREIGN PATENT DOCUMENTS 60-81625 5/1985 Japan .................. 361/380

*Primary Examiner*—Leo P. Picard
*Assistant Examiner*—Michael W. Phillips
*Attorney, Agent, or Firm*—Finnegan, Henderson, Farabow, Garrett & Dunner

[57] ABSTRACT

A portable electronic apparatus includes a base having a and a tilt leg slidably connected to the base. The tilt leg is slideable between a tilting position for tilting the keyboard forwardly and an untilting position for storing the tilt leg in the base. The base has an external release switch having an internal projection for cooperating with a biased fixing member positioned on an opposite side of the tilt leg, releasing the tilt leg from the tilting position and the untilting position. The tilt leg includes a slot to provide clearance for the release switch projection during sliding movement of the leg. The tilt leg is compact because of the sliding construction.

8 Claims, 13 Drawing Sheets

TILTABLE PORTABLE ELECTRONIC APPARATUS WITH SLIDING TILT LEG

This is a division of U.S. application Ser. No. 07/598,519, filed Oct. 17, 1990.

BACKGROUND OF THE INVENTION

1. Field of the Invention

This invention relates to a portable electronic apparatus, such as a laptop computer or a portable word processor.

2. Description of the Related Art

A portable computer disclosed in U.S. Pat. Nos. 4,864,523, 4,895,231, 4,901,261 or U.S. Pat. No. 4,951,241 has a base unit and a display unit pivotally connected to the base unit. The base unit has a keyboard. The display unit is able to rotate between a closed position where the display unit covers the keyboard and an open position where the keyboard is exposed and is able to be operated.

The portable computer has a U-shaped handle assembly. The handle assembly has a pair of legs slidably connected to the computer and a handle interconnecting with the legs. The handle assembly is able to slide between a stored position where the handle contacts the computer and a projected position where the handle is gripped by an operator. The computer has a pair of leg storing portion. The legs are almost wholly stored in the leg storing positions in the stored position, respectively. The computer which has a U-shaped handle assembly is big because the computer has two leg storing portions.

The computer has a floppy disk drive (FDD) and a hard disk drive (HDD). The FDD and HDD are disposed on a same inner surface in the computer, respectively. Consequently the width of the computer is not able to be smaller than a sum of widths of the FDD and HDD.

The computer has a tilt assembly which is slidably moved between a tilting position where the keyboard is tilted forwardly and a untilting position where the keyboard is not tilted. The tilt assembly is big because the tilt assembly is rotated between the tilting position and the untilting position.

The display unit has an outer case and an inner case. The outer case is coupled to the inner case by a screw. The screw is covered by a flexible resin cover. The resin cover is removably fixed to the display unit. But the resin cover is hard to remove from the display unit because the engagement of the resin cover and the display unit is tough.

The keyboard of the computer has character keys and function keys. The character keys and function keys are separated by partition wall. When the computer is small, the partition wall is thin. When the partition wall is thin, the wall bends. If the wall bends, the wall contacts the keys and an ability of an operation of the keys becomes more difficult.

The computer has an expansion card storing portion. After an expansion card is installed in the portion, a resin cover covers the portion. But the cover is not electrically connected to the card. Consequently, the generation of an electromagnetic wave generated by the expansion card cannot be prevented.

SUMMARY OF THE INVENTION

It is a first object of the present invention to provide a portable electronic apparatus having a small leg storing portion of a handle assembly.

It is a second object of the present invention to provide a portable electronic apparatus including a base unit having a floppy disk drive and a hard disk drive which is arranged on the floppy disk drive.

It is a third object of the present invention to provide a portable electronic apparatus having a small tilt assembly which is not required to be rotated.

It is a fourth object of the present invention to provide a portable electronic apparatus having a flexible screw cover which is easy to remove from the computer and firmly engages the cover and the computer.

It is a fifth object of the present invention to provide a portable electronic apparatus including a keyboard having character keys and function keys and a thin partition which is prevented from bending.

It is a sixth object of the present invention to provide a portable electronic apparatus having an expansion card storing portion and a cover which prevents the generation of an electromagnetic wave by the expansion card.

In order to achieve the first object, a portable electronic apparatus of the present invention comprises a base unit including a handle storing portion and a leg storing portion, T-shaped handle assembly including a leg which is stored in the leg storing portion and connected to the base unit and has a longitudinal axis and handle connecting portion and a handle which is stored in the handle storing portion and is slidably connected to the handle connecting portion. The handle is able to slide in a direction of the longitudinal axis and rotate between a stored position where the handle and the leg are stored in the handle storing portion and the leg storing portion, respectively, and a projected position where the handle is gripped by a user. According to the apparatus of the present invention, the handle assembly is stored in a compact space because the handle is able to slide in the direction of the longitudinal axis.

In order to achieve the second object, a portable electronic apparatus of the present invention comprises a base unit which has a first mounting portion, a first disk drive which is mounted on the first mounting portion, a drive housing which has a second mounting portion, a second disk drive which is fixed on the first mounting portion, a first screw which fixes the first disk drive and the drive housing on the first mounting portion and a second screw which fixes the second disk drive on the second mounting portion. According to the portable electronic apparatus of the present invention, the width of the apparatus is not limited by widths of the first and the second disk drives.

In order to achieve the third object, a portable electronic apparatus of the present invention comprises a base unit having a tilt leg storing portion and a keyboard, a tilt leg which is slidably connected to the base unit between a tilting position where keyboard is tilted forwardly and a storing position where the tilt leg is stored in the tilt leg storing portion, a biased engaging member which engages the leg in the tilting position and the storing position and a switch releasing the engagement of the leg and the engaging member. According to the apparatus of the present invention, the leg storing portion of the base unit is compact because the leg does not rotate.

In order to achieve the fourth object, a portable electronic apparatus of the present invention comprises a display unit including an outer case having a screw engaging portion and an inner case which has a cover storing portion having a cover storing surface having a through hole for screw and a cover engaging hole and a cover which has a thick portion and a thin portion having a claw which is engaged with the cover engaging hole. An inner surface of the thin portion is not contact with the storing surface. When the thin portion is pushed by an operator, the thin portion is bent. When the thin portion is bent, the claw which is engaged with the cover engaging hole is released from the cover engaging hole.

In order to achieve the fifth object, a portable electronic apparatus of the present invention comprises a base unit including a keyboard which has a character keys, function keys and an engaging hole, and a front top cover which has a partition wall which has a engaging claw engaged with the engaging hole. When the front top cover is mounted on the keyboard, the engaging claw is engaged with the engaging hole and the partition wall is not bent.

In order to achieve the sixth object, a portable electronic apparatus of the present invention, comprises a base unit including a card storing portion having a first connector which is electrically connecting an expansion card and a first inner surface, a cover which covers the card storing portion and has a second inner surface having a spring. The spring pushes and fixes the expansion card in a direction of the first inner surface and electrically connects the expansion card and the cover.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiments given below, serve to explain the principle of the invention.

DETAILED DESCRIPTION OF THE PREFERRED EMBODIMENTS

Figure 1:
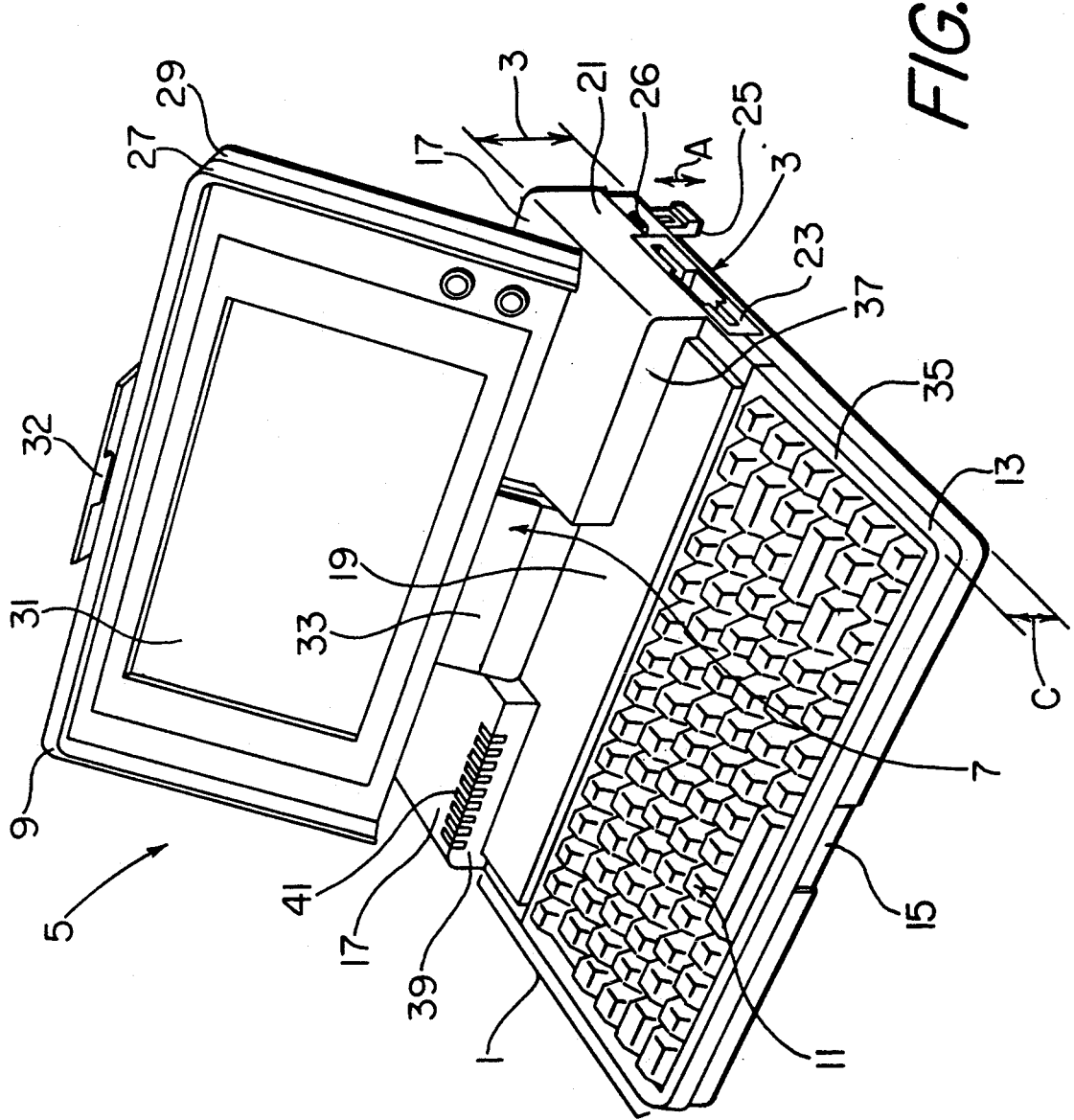
FIG. 1 is a perspective view of a laptop computer according to an embodiment of the present invention.

FIG. 1 is a perspective view of a laptop computer.

A laptop computer 5 has a base unit 3 and a display unit 9. Base unit 3 has a front portion 1. A keyboard 11 and a front top cover 13 are fixed on the front portion 1. A handle assembly 15 is pivotally connected to a front end of the base unit 3. Base unit 3 has a rear top surface 17 and a display leg mounting surface 19. A side wall 21 of base unit 3 has a floppy disk drive (FDD) 23 and a tilt leg release switch 26. A rear portion of a bottom surface of base unit 3 has a tilt leg 25. Tilt leg 25 is slided in a direction of an arrow A. Base unit 3 has a right center wall 37 and a left center wall 39. Light electroluminescence devices (LEDs) 41 are mounted in a corner between left center wall 39 and rear top surface 17. Display unit 9 has a display leg 7. Display leg 7 is mounted on mounting surface 19. Display unit 9 is pivotally connected to base 3 by display leg 7. Display unit 9 has an inner case 27, an outer case 29, display surface 31, a display latch claw 32 and a screw cover 33. Screw cover 33 is removably fixed on display leg 7. A height B between rear top surface 17 and the bottom surface of base unit 3 is greater than a height C between a front top surface 35 and the bottom surface.

Figure 2:
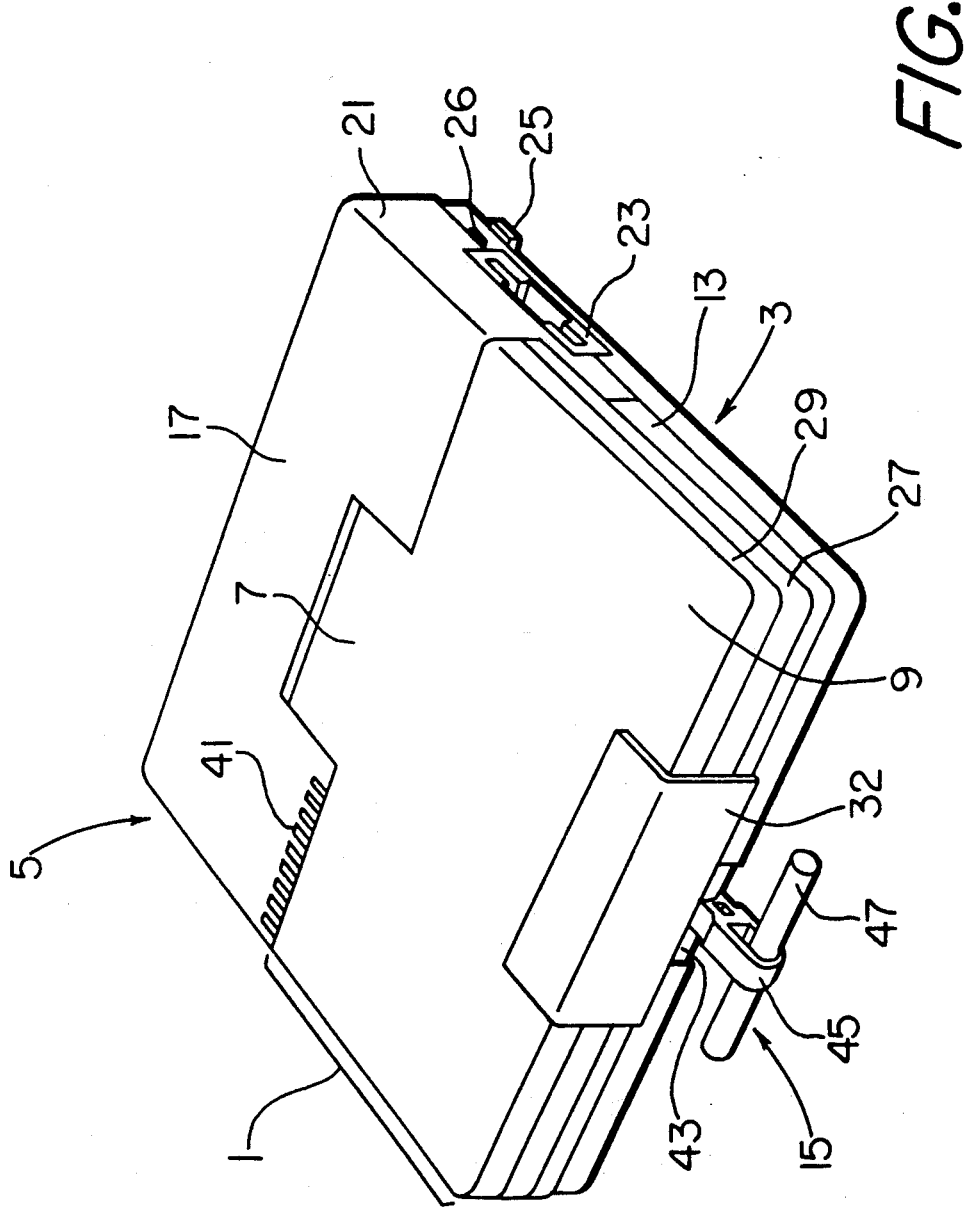
FIG. 2 is a perspective view of the laptop computer when a display unit is set in a closed position, a handle assembly is set in a projecting position and a tilt leg assembly is set in a stored position.

FIG. 2 is a perspective view of the laptop computer when the display unit 9 is set in a closed position, the handle assembly 15 is set in a projecting position and the tilt leg 25 is set in a stored position.

Display unit 9 rotates between an open position (shown in FIG. 1) for exposing and operating keyboard 11 and a closed position (shown in FIG. 2) for covering keyboard 11. When display unit 9 is set in the closed position, an outer surface of outer case 29 and rear top surface 17 are maintained at a common height level. Tilt leg 25 slides between an tilting position (shown in FIG. 1) for tilting keyboard 11 forwardly and an stored position (shown in FIG. 2) for untilting keyboard 11. Handle assembly 15 has a handle axis portion 43, a leg portion 45 which is fixed to handle axis portion 43 and handle portion 47 which is slidably connected to leg portion 45. Handle assembly 15 rotates between a storing position (shown in FIG. 1) for storing handle assembly 15 and a projecting position (shown in FIG. 2) for gripping handle portion 47.

Figure 3:
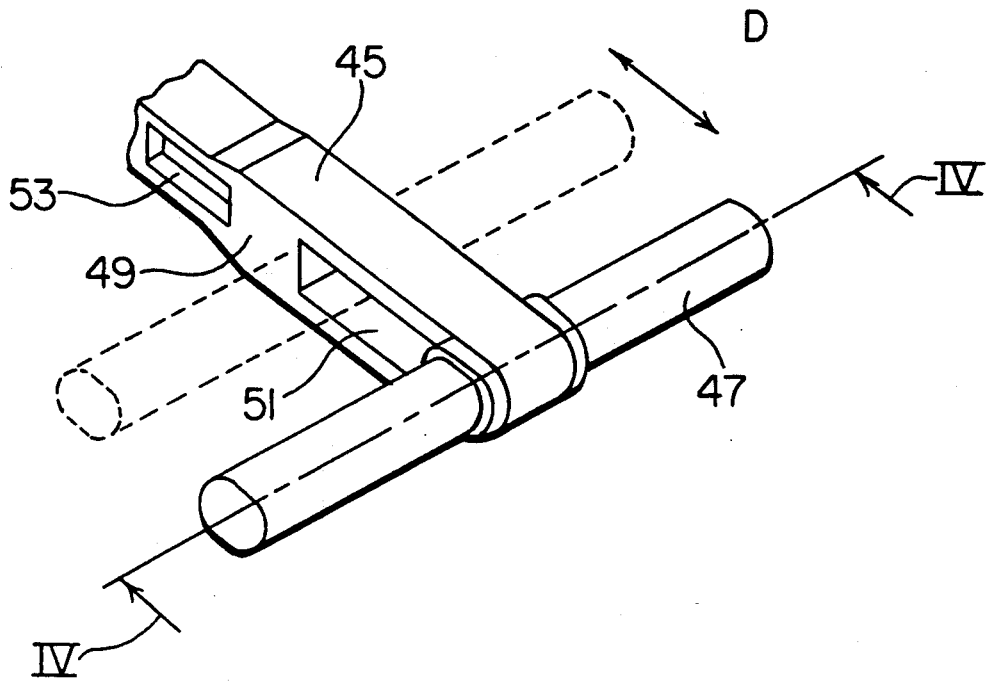
FIG. 3 is a perspective view for explaining a movement of a handle of the handle assembly.

FIG. 3 is a perspective view for explaining a movement of the handle assembly.

A side surface 49 of leg portion 45 has a rectangle hole 51 and an engaging groove 53. Handle portion 47 is slidably connected to rectangle hole 51. Handle portion slides between a handle gripping position (shown by a continuous line) and handle storing position (shown by a dotted line).

Figure 4:
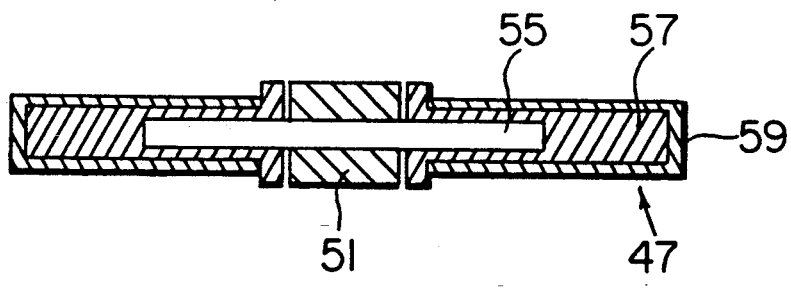
FIG. 4 is a sectional view taken along line IV—IV of FIG. 3.

FIG. 4 is a sectional view taken along line IV—IV of FIG. 3.

Handle portion 47 has a metal axis portion 55, a resin portion 57 for connecting metal axis portion in rectangle hole 51 and a rubber portion 57 covering resin portion 57.

Figure 5:
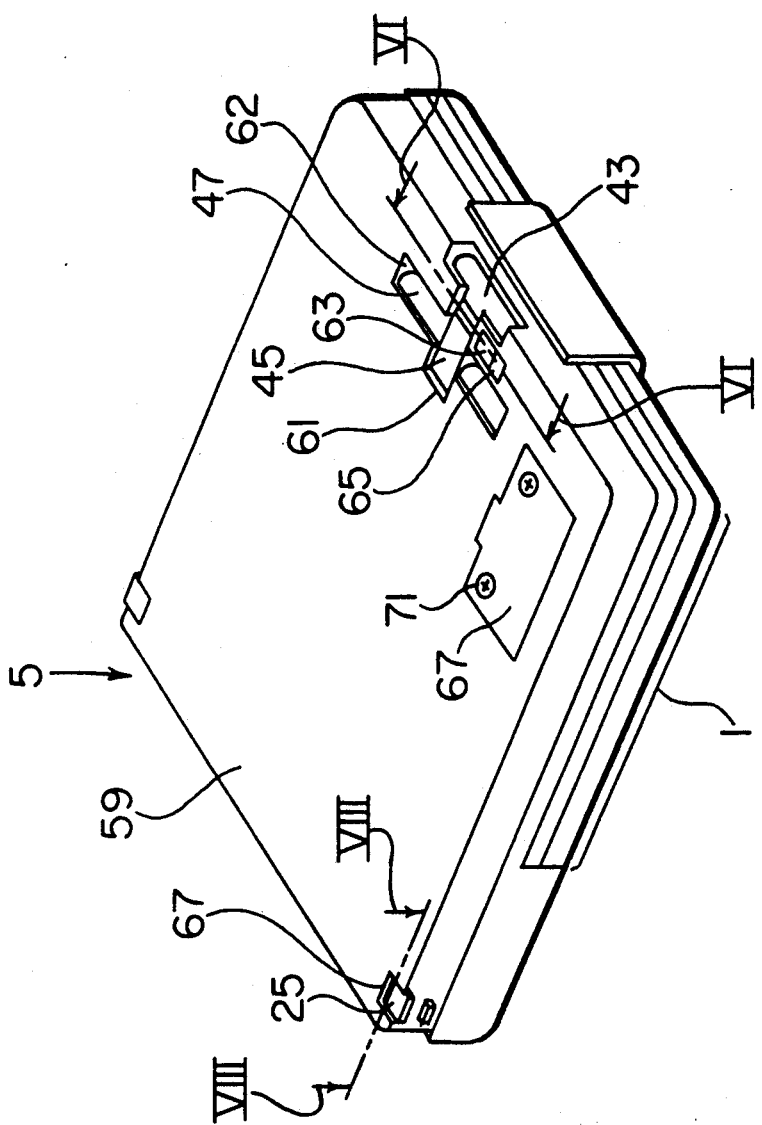
FIG. 5 is a perspective bottom view of FIG. 2.

FIG. 5 is a perspective bottom view of FIG. 2.

A bottom surface 59 of base unit 3 has a leg storing groove 61 and a handle storing groove 62 in a front end. Handle portion 47 is stored in groove 62 in the handle storing position. In the front end, bottom surface 59 has a switch storing portion 65 and a release switch 63 stored in switch storing portion 65. A rear end of bottom surface 59 has a pair of tilt leg storing portions 67. A card storing portion cover 69 is fixed on bottom surface 59 by screw 71.

Figure 6A:
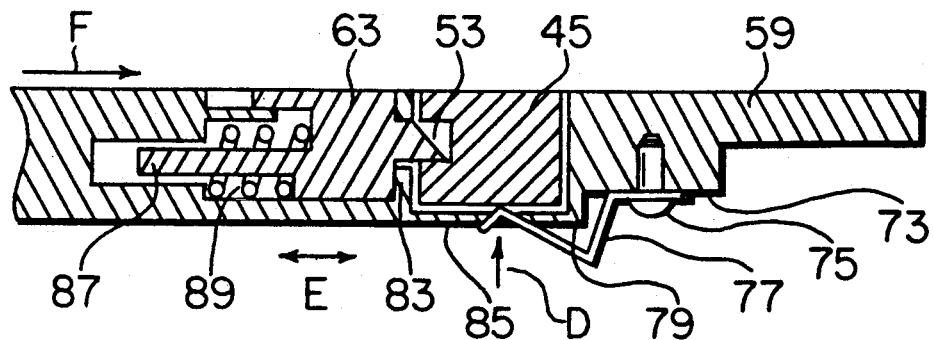
FIGS. 6A-6C are sectional views taken along line VI—VI of FIG. 5 for explaining a movement of of the handle assembly.
Figure 6B:
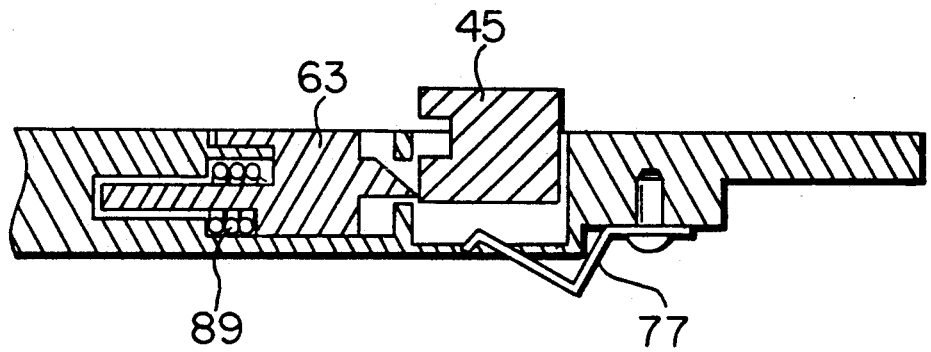
Figure 6C:
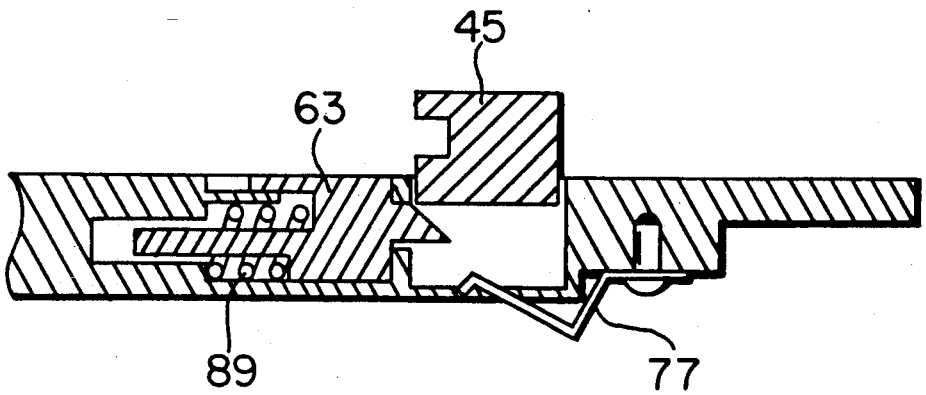

FIGS. 6A–6C are sectional views for explaining a movement of the handle assembly.

FIG. 6A is a sectional view taken along line VI—VI of FIG. 5. One end of a flat spring 77 is fixed on an inner surface 73 of base unit 3 by a screw 75. Inner surface 73 has an opening 79. The other end of flat spring 77 inserted in opening 79. The other end of spring 77 pushes leg portion 45 in a direction of an arrow D. Switch storing portion 65 has a side opening 83. One end of release switch 63 has a latch claw 83. Latch claw 83 is inserted in side opening 83. Latch claw 83 is engaged with engaging groove 53. Release switch 63 is slidable in a direction of an arrow E. The other end of release switch 63 has a spring holder 87. A coil spring 89 is wound around spring holder 87. Coil spring 89 pushes release switch 63 in a direction of an arrow F. When a user slides release switch 63, as shown in FIG. 6B, latch claw 83 is released from engaging groove 53. Coil spring 89 is contracted. When latch claw 83 is released, leg portion 45 projects from leg storing groove 61 by a force of flat spring 77. When the user releases switch 63, as shown in FIG. 6C, release switch 63 returns to a position shown in FIG. 6A by a force of coil spring 89.

Figure 7:
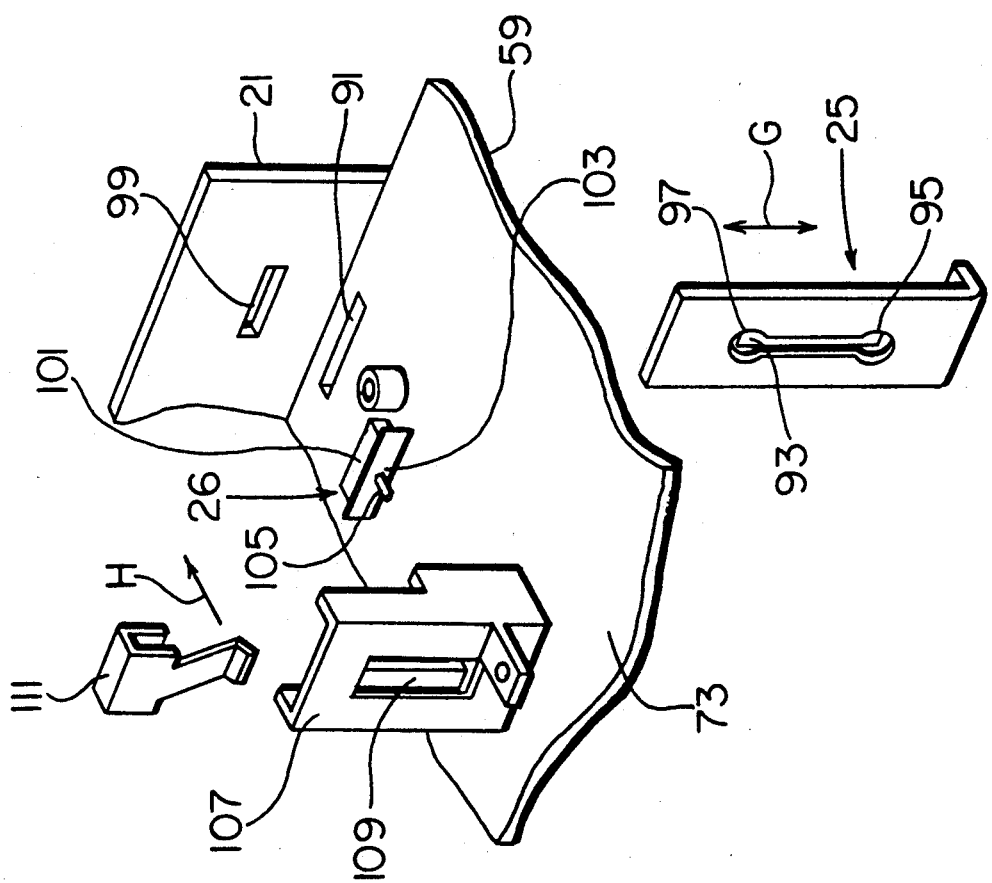
FIG. 7 is an exploded perspective view of a tilt leg assembly.

FIG. 7 is an exploded perspective view of the tilt leg assembly.

Bottom surface 59 (FIG. 5) has a slit 91. Tilt leg 25 is inserted in slit 91. Tilt leg has a slit 93. One end of slit 93 has a first groove 95 for fixing tilt leg 25 in the stored position. The other end of slit 93 has a second groove 97 for fixing tilt leg 25 in the tilting position. Side wall 21 has a slit 99 for inserting release operator 26. Tilt leg release operator 26 has a head portion 101, a stopper portion 103 and a projecting portion 105. Head portion 101 is inserted in slit 99 and projected from side wall 21. Stopper portion 103 prevents release operator 26 falling out from slit 99. A leg holder 107 slidably supports tilt leg 25 in the direction of arrow G. Leg holder 107 includes a elastic portion 109 having an engaging portion which is engages first and second grooves 95, 97. A flat spring 111 is fixed on leg holder 107. Flat spring 111 pushes the engaging portion in the direction of arrow H. Leg holder 107 is fixed on inner surface 73 of base unit 3.

Figure 8C:
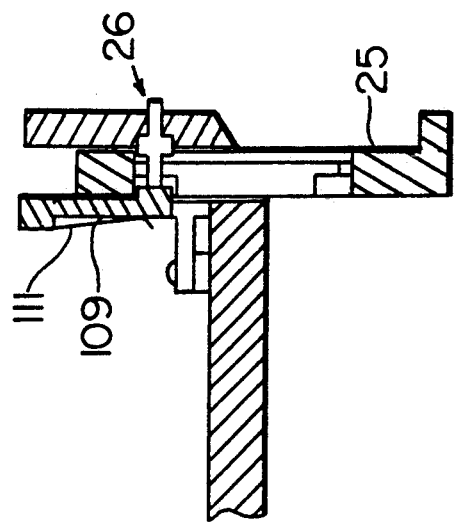
FIG. 8A-8C are sectional views taken along line VIII—VIII of FIG. 5 for explaining a movement of the tilt leg assembly.
Figure 8B:
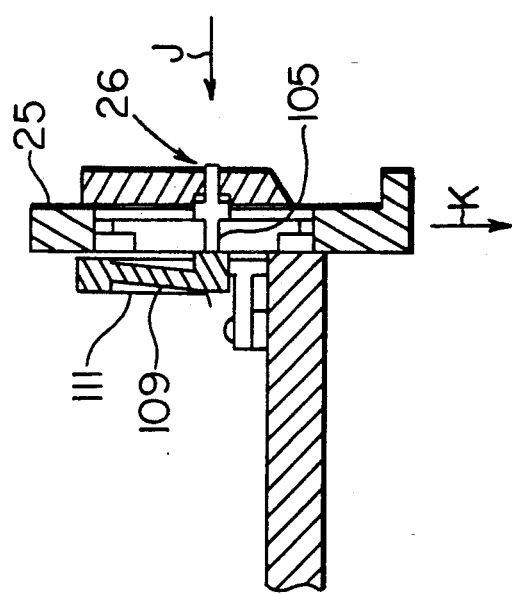
Figure 8A:
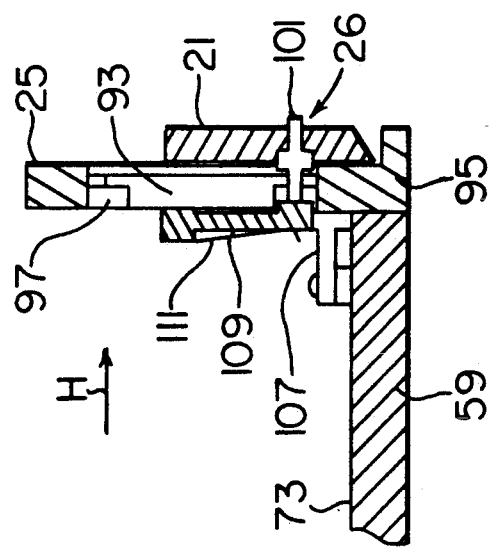

FIG. 8A–8C are sectional views for explaining the movement of the tilt leg assembly.

FIG. 8A is a sectional view taken along line VIII—VIII of FIG. 5. When tilt leg 25 is stored in the storing position, the engaging portion of elastic portion 109 is engaged with first groove 95. Tilt leg fixed in the storing portion because the engaging portion is pushed in the direction of arrow H by flat spring 111. When a user pushes head portion 101 of release operator 26 in the direction of arrow J, as shown in FIG. 8B, projecting portion 105 pushes the engaging portion of elastic portion 109 and the engaging portion is released from first groove 95. When the engaging portion is released, tilt leg 25 is able to slide in the direction of arrow K. When the user slides tilt leg 25 in the direction of arrow K, the engaging portion of elastic portion 109 is inserted in and engaged with second groove 97 by spring 111.

Figure 9:
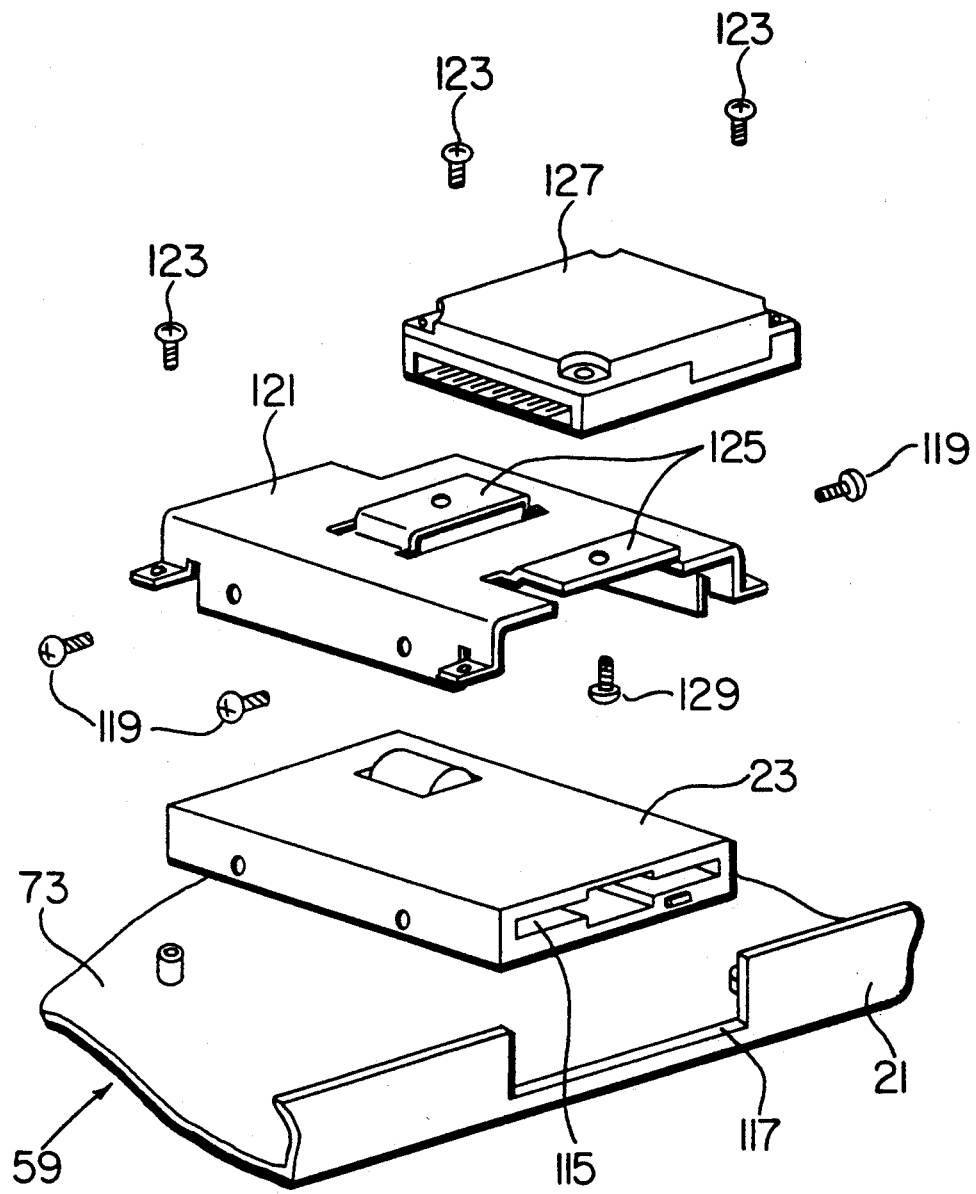
FIG. 9 is an exploded perspective view of a disk drive assembly.

FIG. 9 is an exploded perspective view of a disk assembly.

Side wall 21 of base unit 3 has a hole 117 for exposing a disk inserting portion 115 of 3.5 inches FDD 23. FDD 23 is fixed in drive housing 121 by screws 119. Drive housing 121 is fixed on inner surface 73 by screws 123. Drive housing 121 has a pair of hard disk mounting surfaces 125. A 2.5 inches hard disk drive (HDD) 127 is fixed on mounting surfaces 125 by screw 129. FDD 23 and HDD 127 are fixed on the same drive housing 121. Consequently the space of the disk assembly is compact.

Figure 10:
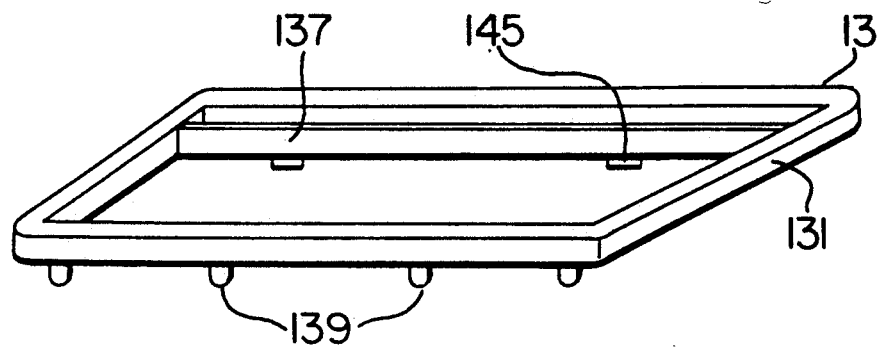
FIG. 10 is a perspective view of a front top cover.
Figure 11:
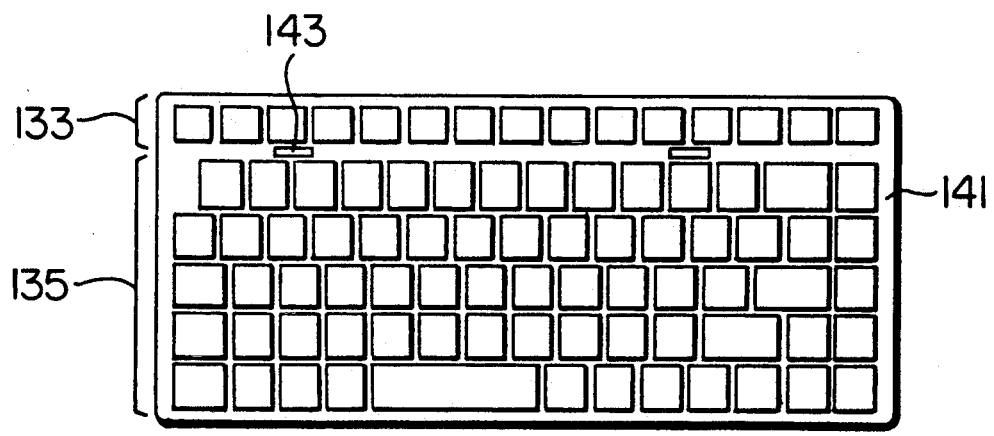
FIG. 11 is a top view of a keyboard.

FIG. 10 is a perspective view of a front top cover and FIG. 11 is a top view of a keyboard.

Front top cover 13 includes an outer frame 131 having screw engaging bosses 139 and an partition wall 137, for separating function keys 133 and character keys 135 of keyboard 11, having a pair of engaging claws 145. A plate 141 of keyboard 11 has a pair of engaging grooves 143. When keyboard 11 and front top cover 13 are assembled on base unit 3, engaging claws 145 are engaged with engaging grooves 143. Consequently, even though the partition wall is thin, partition wall bending is prevented.

Figure 12:
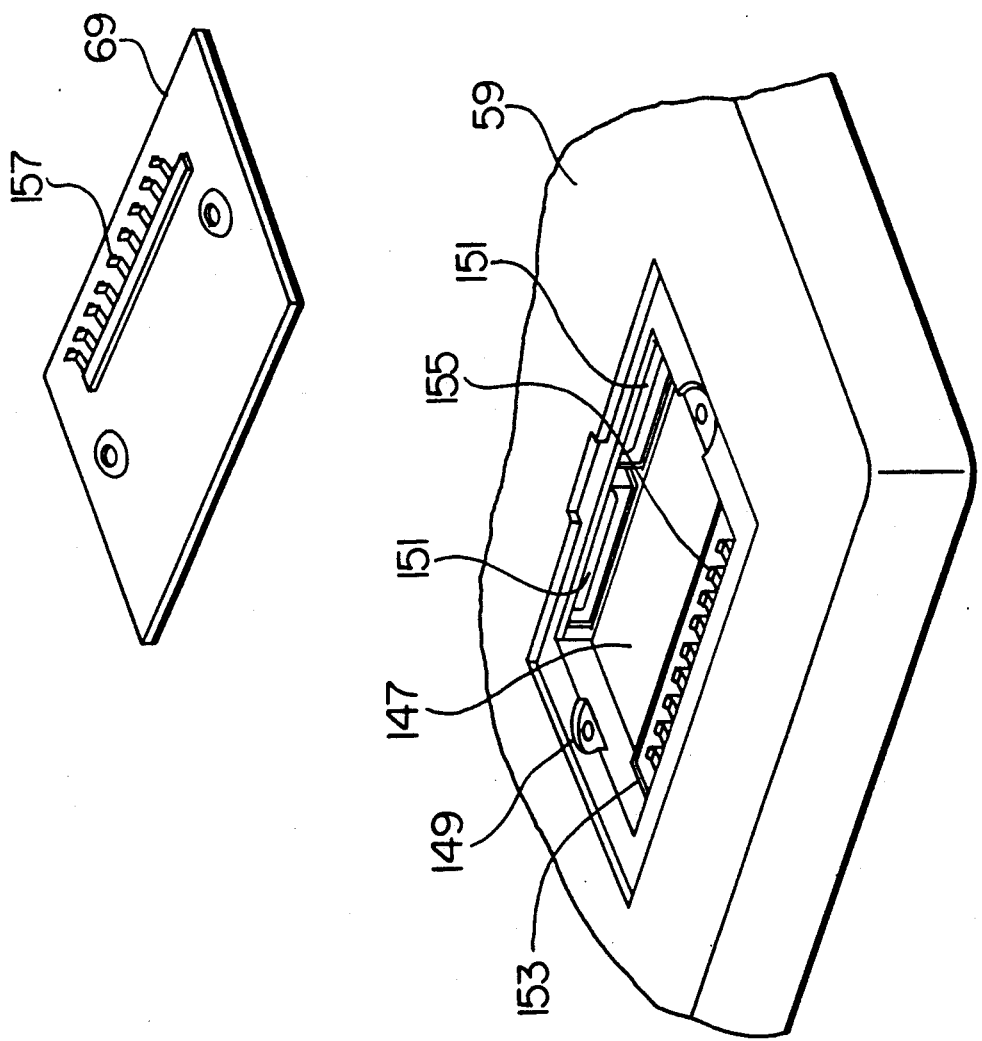
FIG. 12 is a perspective view of a card storing portion and a storing portion cover.
Figure 13:
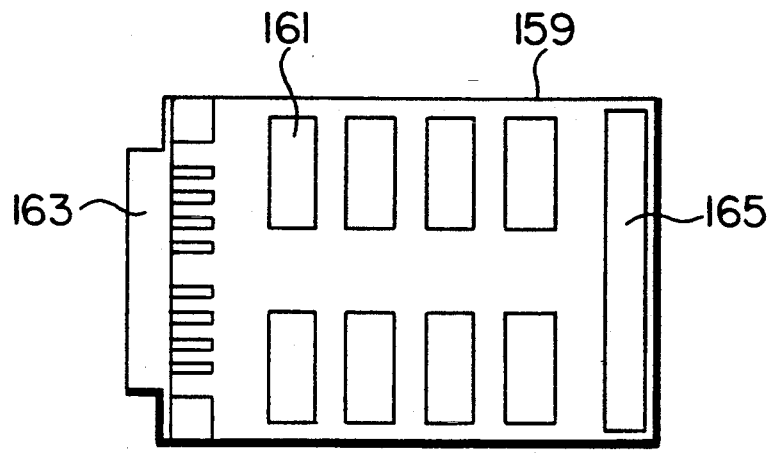
FIG. 13 is a top view of an expansion card.

FIG. 12 is a perspective view of a card storing portion of the base and the card storing portion cover and FIG. 13 is a top view of an expansion card.

Bottom surface 59 of base unit 3 has an expansion card storing portion 147. Storing portion 147 is coated by an electric conducting material. One side of storing portion 147 has connectors 151 fixed on the inner surface of base unit 3. Opposite side of storing portion 147 has a card mounting wall 153 and a stopper claws 155 for preventing an expansion card slipping. Card storing portion cover 69 has a flat metal spring 157 fixed on an inner surface of cover 69. Cover 69 is an electric conductor. An expansion card 159 has a connector 163 connected to connectors 151, expansion memories 161 and an electric conducting plate 165.

Figure 14:
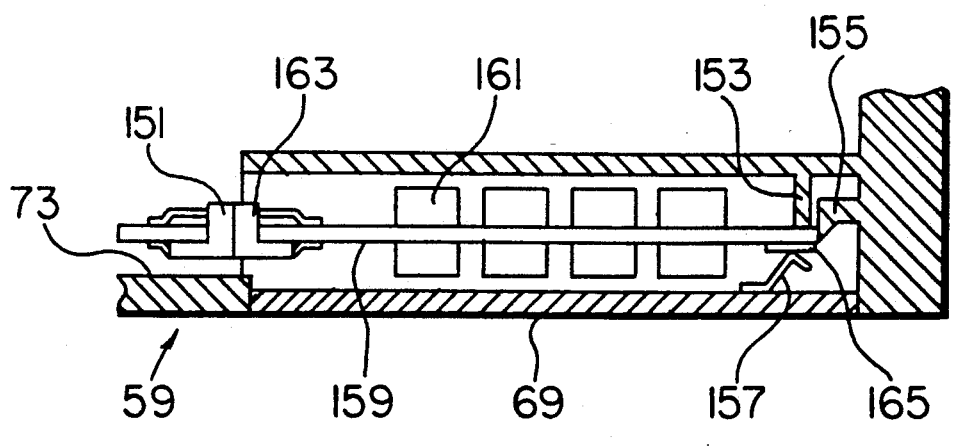
FIG. 14 is a sectional view for explaining a storing condition of the expansion card.

FIG. 14 is a sectional view for explaining a storing condition of the expansion card.

When an expansion card is stored in storing portion 147 and cover 69 is fixed on bottom surface 59 by screw 71, (see FIG. 5), spring 157 contacts conducting plate 165 and pushes card 159 on card mounting wall 153. Inner surface 73 is coated by the electric conducting material. Consequently expansion card is electrically connected to base unit 3 through plate 165, spring 157, cover 69 and screw 71 and the generation of an electromagnetic wave is prevented.

Figure 15:
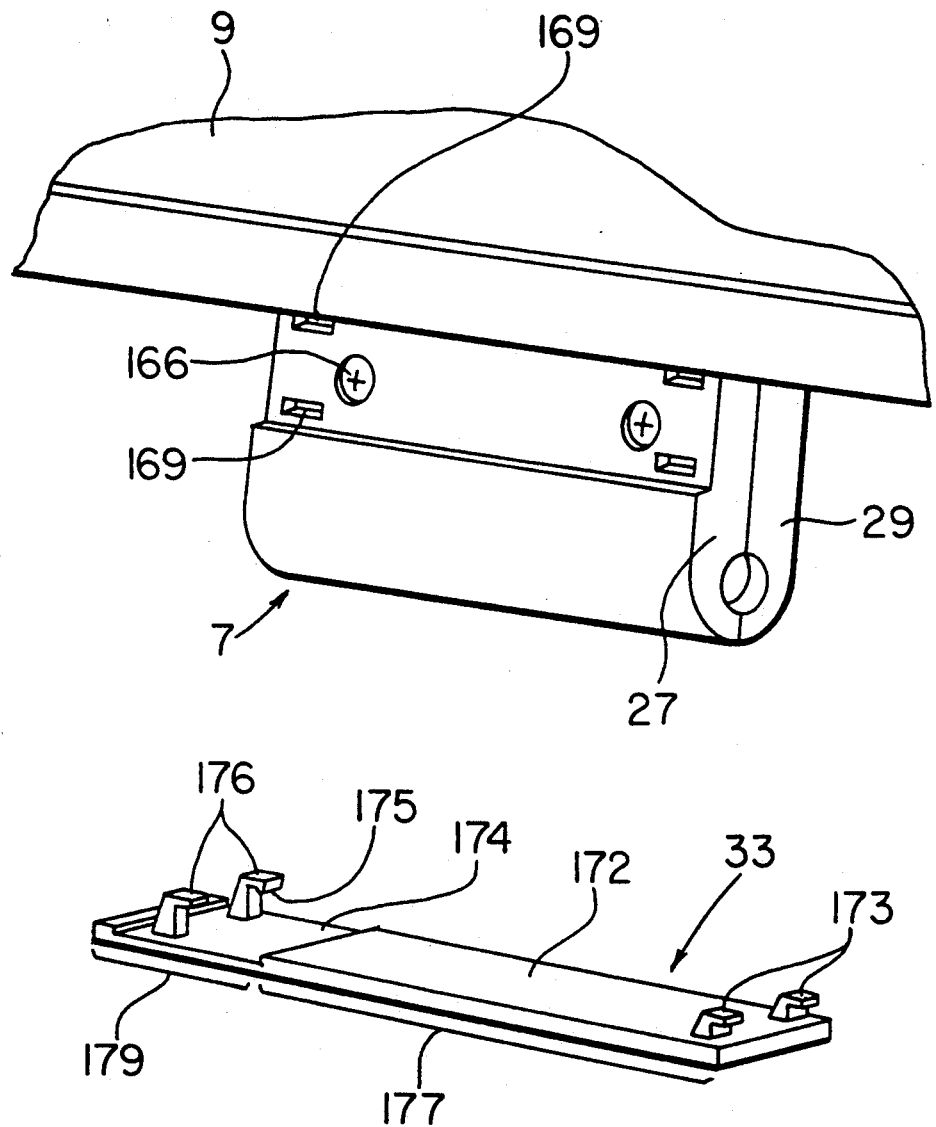
FIG. 15 is a perspective view of a display leg and a screw cover.

FIG. 15 is a perspective view of a display leg and a screw cover.

Inner cover 27 includes a cover storing portion having through holes and engaging holes 169. Outer cover 29 has screw engaging portion. Inner cover 27 and outer cover 29 are engaged by screws 166. Screw cover 33 has a thick portion 177 and a thin portion 179. An inner surface 172 of thick portion 177 has a pair of supporting claws 173. An inner surface 174 of thin portion 179 has a pair of engaging claws 176 having a engaging portion 175, respectively. Inner surface 172 is contacted a surface of the cover storing portion. Inner surface 174 is not contacted with the surface.

Figure 16A:
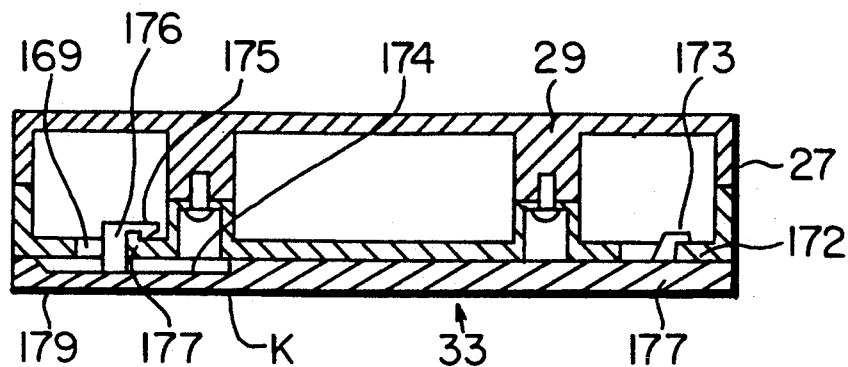
FIGS. 16A-16C are sectional view for explaining a movement of a claw of the screw cover.
Figure 16B:
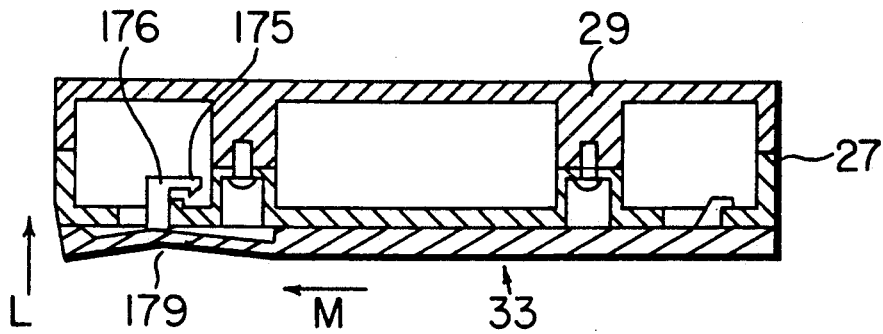
Figure 16C:
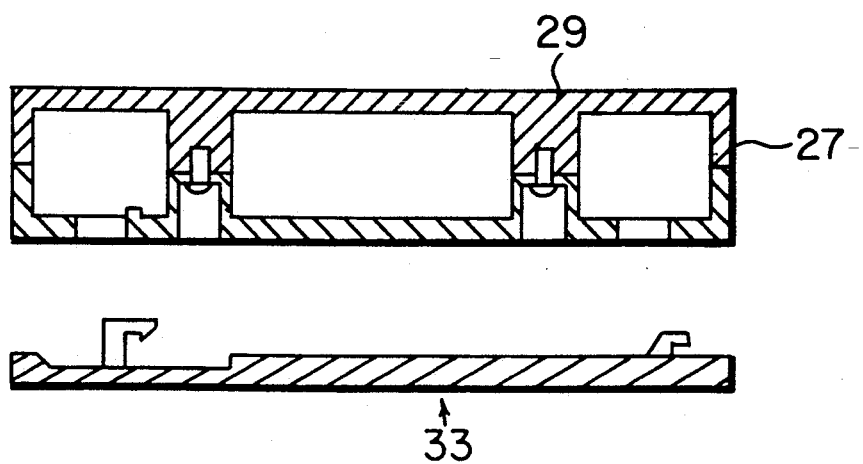

FIG. 16A–16C are sectional views for explaining the movement of the screw cover.

When screw cover is fixed on the cover storing portion, as shown in FIG. 16A, a space K is formed between inner surface 174 and the surface of the cover storing portion. Engaging portions 175 are engaged with an inner surface of inner case 27. Supporting claws 173 are supported on the inner surface of inner case 27. When a user pushes thin portion 179 in the direction of arrow L, as shown in FIG. 16B, thin portion 179 is bent. When thin portion 179 are bent, engaging portions 175 is released from the inner surface of the cover storing portion. In this condition, if the operator slides cover 33 in the direction of an arrow M, cover 33 is released from inner case 27.

What is claimed is:

1. A tiltable portable electronic apparatus comprising:
   a base having a keyboard and a tilt leg storing portion;
   a tilt leg having opposing sides, being slidably connected to the tilt leg storing portion, and having a first stopped portion for stopping the leg in an untilting position where the keyboard is not tilted and a second stopped portion for stopping the leg in a tilting position where the keyboard is tilted forwardly;
   fixing means positioned on one of said opposed leg sides for fixing the leg in the first stopped and the second stopped positions, respectively; and
   releasing means positioned on the other of said opposed leg sides and cooperating with said fixing means for releasing the leg from the fixing means.

2. The tiltable portable electronic apparatus as in claim 1, wherein said fixing means includes an engaging member biased for engaging said first and said second stopped portions of said leg, and wherein said releasing means includes means for moving said engaging member against the bias to disengage said engaging member.

3. The tiltable portable electronic apparatus as in claim 2, wherein said moving means includes a projection and wherein said leg includes slit means extending between said first and second stopped portions for providing clearance for said projection during movement of said leg between said untilting and tilting positions.

4. A tiltable portable computer comprising:
   a base housing including a keyboard having a front edge, a bottom surface having a leg storing slit and a side surface having a side opening;
   a tilt leg slidably stored in the storing slit, including a first leg side surface, a second leg side surface being opposite to the first leg side surface and a guide slit having a first end and a second end, the firs end having a first stopped hole, the second end having a second stopped hole, the tile leg being slidable between a stored position for storing the leg in the storing slit and a projecting position wherein the leg projects from the bottom surface so as to tilt the keyboard in a direction of the front edge;
   a leg holder disposed adjacent to the first leg side surface, including an eleastic member being movable between an engaged position for engaging with the first and the second stopped holes and a released position for releasing the engagement, the elastic member engaging with the first stopped hole when the tilt leg is in the stored position and engaging with the second stopped hole when the tilt leg is in the projecting position;
   a spring disposed adjacent to the first leg side surface, biasing the elastic member toward the second leg side surface so as to maintain the engagement between the respective stopped holes and the elastic member when the tilt leg is in the stored and projecting positions;
   a push button including a top portion slidably inserted in the side opening and a bottom portion having a guide pin inserted in the guide slit, the top portion being slidable between a pushing position for pushing the elastic member against the spring with the guide pin so as to release the engagement of the respective one of the stopped holes and the elastic member and non-pushing position for maintaining the engagement.

5. The tiltable portable computer according to claim 4, wherein the first and the second stopped holes are disposed in the first leg side surface.

6. The tiltable portable computer according to claim 5, wherein the elastic member includes a projection which is movable between the engaged position and the released position and an elastic plate for allowing the movement of the projection.

7. A tiltable portable computer comprising:
   a base housing including a keyboard having a front edge, a bottom surface having a leg storing slit and a side surface having a side opening;
   a tilt leg slidably stored in the storing slit, including a first leg side surface, a second leg side surface being opposite to the first surface, a guide slit having a first end and a second end, a first stopping portion and a second stopping portion, the tilt leg being slidable between a stored position for storing the leg in the storing slit and a projecting position for projecting the leg from the bottom surface so as to tilt the keyboard in a direction of the front edge;
   a leg holder disposed adjacent to the first leg side surface, including an elastic member being movable between an engaged position for engaging with the first and the second stopping portions and a released position for releasing the engagement, the elastic member engaging with the first stopping portion when the tilt leg is in the stored position and engaging with the second stopping portion when the tilt leg is in the projecting position;
   a spring disposed adjacent to the first leg side surface, biasing the elastic member toward the second leg side surface so as to maintain the engagement between the respective stopping portions and the elastic member when the tilt leg is in the stored and projecting positions;
   a push button including a top portion slidably inserted in the side opening and a bottom portion having a guide pin inserted in the guide slit, the push button being slidable between a pushing position for pushing the elastic member against the spring with the guide pin so as to release the engagement of the respective one of the stopping portions and the elastic member and non-pushing position for maintaining the engagement.

8. The tiltable portable computer according to claim 7, wherein the first stopping portion is continuous with the one end and the second stopping portion is continuous with the other end.

* * * * *

UNITED STATES PATENT AND TRADEMARK OFFICE
CERTIFICATE OF CORRECTION

PATENT NO. : 5,239,444
DATED : August 24, 1993
INVENTOR(S) : Katumaru Sasaki

It is certified that error appears in the above-indentified patent and that said Letters Patent is hereby corrected as shown below:

Abstract, line 2, change "a and" to --a keyboard and--.

Claim 4, column 7, line 50, change "firs" to --first--.

Claim 4, column 7, line 52, change "tile" to --tilt--.

Claim 4, column 7, line 58, change "eleastic" to --elastic--.

Signed and Sealed this

Twelfth Day of July, 1994

Attest:

BRUCE LEHMAN

*Attesting Officer*     *Commissioner of Patents and Trademarks*